US007006035B2

(12) United States Patent
Arethens

(10) Patent No.: US 7,006,035 B2
(45) Date of Patent: Feb. 28, 2006

(54) METHOD FOR THE GROUND-BASED MONITORING OF EWF-TYPE ANOMALIES IN A POSITIONING SATELLITE SIGNAL

(75) Inventor: Jean-Pierre Arethens, Beaumont les Valence (FR)

(73) Assignee: Thales, Neuilly sur Seine (FR)

( * ) Notice: Subject to any disclaimer, the term of this patent is extended or adjusted under 35 U.S.C. 154(b) by 84 days.

(21) Appl. No.: 10/494,468

(22) PCT Filed: Nov. 5, 2002

(86) PCT No.: PCT/FR02/03784

§ 371 (c)(1),
(2), (4) Date: Apr. 30, 2004

(87) PCT Pub. No.: WO03/040748

PCT Pub. Date: May 15, 2003

(65) Prior Publication Data

US 2004/0246173 A1 Dec. 9, 2004

(30) Foreign Application Priority Data

Nov. 7, 2001 (FR) .................................. 01 14396

(51) Int. Cl.
*G01S 1/02* (2006.01)
*G01S 5/14* (2006.01)

(52) U.S. Cl. ................................................ 342/357.02

(58) Field of Classification Search ............ 342/357.02
See application file for complete search history.

(56) References Cited

U.S. PATENT DOCUMENTS 6,169,957 B1 1/2001 Arethens
6,172,638 B1 1/2001 Arethens
6,191,729 B1 2/2001 Arethens
6,195,040 B1 2/2001 Arethens

FOREIGN PATENT DOCUMENTS

WO 01 39698 A 6/2001

OTHER PUBLICATIONS

Phelts R E et al: "Transient Performance Analysis of a Multicorrelator Signal Qualityt Monitor".
Phelts R E et al: "Multipath mitigatuin for narrowband receivers".
Macabiau C et al: "Impact of evil waveforms on GBAS performance".

*Primary Examiner*—Thomas H. Tarcza
*Assistant Examiner*—Fred H. Mull
(74) *Attorney, Agent, or Firm*—Lowe Hauptman & Berner LLP.

(57) ABSTRACT

The method of the invention, which is applicable, in particular, to making positioning signals from GPS and SBAS satellites reliable, consists in performing an instantaneous statistical analysis (of around 1 mn duration) of the correlation peak from the satellite signal receiver and in comparing it to a long-term (several hours) statistical analysis by choosing 5 points which are characteristic of the peak (prompt, ±0.044 and ±0.088). If the result of the comparison exceeds a given threshold, the corresponding signals are rejected.

3 Claims, 1 Drawing Sheet

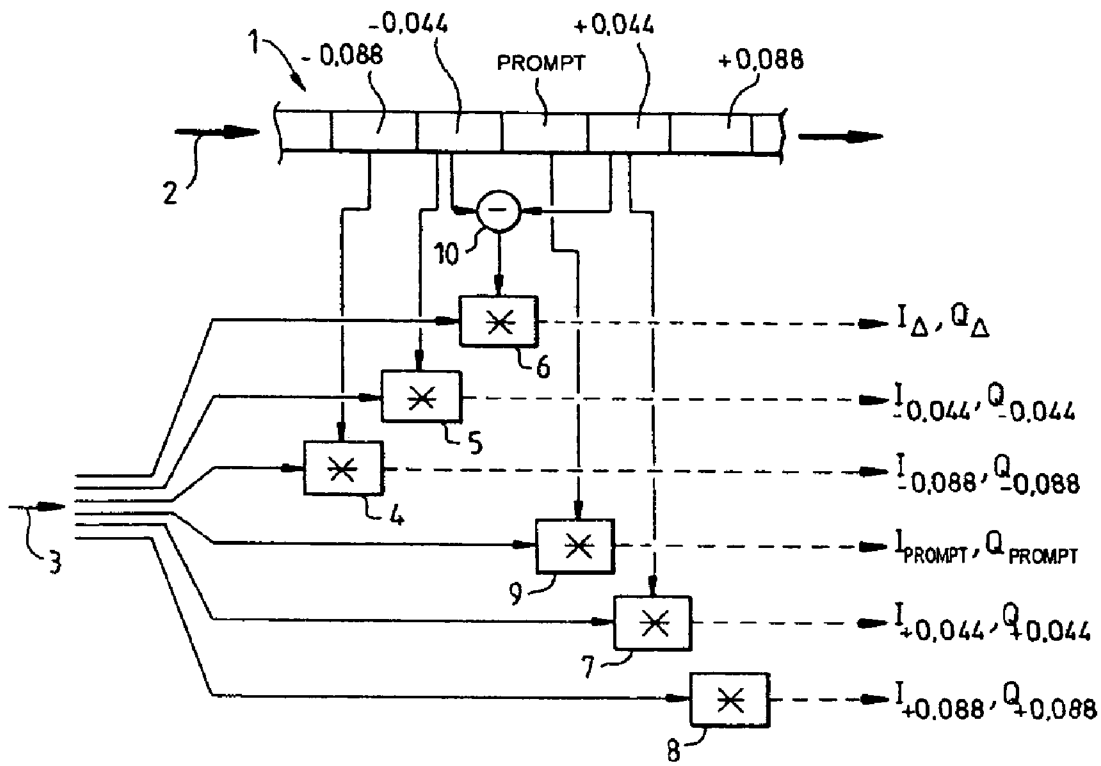
1
-0,088
-0,044
PROMPT
+0,044
+0,088
2
10
6
5
4
3
9
7
8
I_Δ, Q_Δ
I-0,044, Q-0,044
I-0,088, Q-0,088
IPROMPT, QPROMPT
I+0,044, Q+0,044
I+0,088, Q+0,088

METHOD FOR THE GROUND-BASED MONITORING OF EWF-TYPE ANOMALIES IN A POSITIONING SATELLITE SIGNAL

BACKGROUND OF THE INVENTION

1. Field of the Invention

The present invention relates to a method for the ground-based monitoring of EWF-type anomalies in a positioning satellite signal.

DESCRIPTION OF THE RELATED ART

2. Discussion of the Background

Currently, aircraft landing guidance systems are of the ILS type, but, for economic reasons, various States are looking to replace them with GLS guidance systems that use information supplied by satellite networks, in particular GPS. In aircraft, the on-board part of these landing approach guidance systems is of the MMR type that combines ILS systems with GLS and MLS systems.

GLS systems would be the most economical, especially in view of the fact that GPS positioning can supply aircraft with the information needed for their navigation. The performance levels required for navigation in cruise flight allow the GPS system to be used in an autonomous manner offering an accuracy of around 20 to 30 meters and an integrity sufficient for the requirements. In the landing approach phase, where the required vertical precision is around 2 to 3 meters, the system is used in combination with a complementary ground-based means that provides the information necessary to improve the precision and makes the mechanisms available that allow the positioning integrity to be guaranteed.

Numerous studies have been undertaken to determine the sources of the positioning errors affecting GPS measurements. The intentional degradation of the measurements carried out at the satellites was, until it was recently dropped, the main cause of errors on the distance measurements between the receiver and the satellites. Nevertheless, the causes of measurement errors remain from the use of the system of radiopropagation itself, in other words the delays resulting from the propagation of radio waves through the atmospheric layers, as well as the errors resulting from possible reflections known as multiple rays. The estimation of these errors and their communication by ground stations, which group two or more measurement receivers and a means of radiocommunication, allows the user receiving this information to correct their own measurements and thus to implement an accurate differential positioning. There exist, however, other kinds of errors that cannot be eliminated by these differential systems, namely the errors resulting from a degradation in the operation of the satellite network which can generate measurement errors depending on the physical characteristics of the receivers using these signals. For example, when the signal transmitted by a satellite is affected by anomalies known as "EWF3", the interference alters the correlation mechanisms implemented by the receivers and falsifies the distance measurements in a way that depends on the high-frequency filtering analog characteristics of the receiver and the intervals separating the correlation channels and, consequently, falsifies the determination of the position. These phenomena must be detected in order to guarantee the integrity of the differential positioning used for landing approach guidance by aircraft. To remedy this, two or more ground stations in the same reception zone are employed so that, using differential measurements, these errors can be eliminated or sufficiently attenuated. There exist, however, other kinds of errors that cannot be eliminated by these differential systems, namely the errors due to the ephemereses providing the satellite positions and the errors due to the interference affecting the signals transmitted by the satellites. The errors due to the ephemereses arise from the fact that these are manually input by operators and that typing mistakes are always possible. The satellite positioning errors could thus be several kilometers. In order to eliminate them, it suffices to compare several consecutive values and eliminate the one that clearly does not fit.

When the signal transmitted by a satellite is affected by anomalies known as "EWF" (Evil Waveform), the interference distorts the correlation peak produced in the ground-based receivers, which distortion does not allow the correlation to be performed correctly and therefore falsifies the determination of position. To remedy this, a working group has proposed a method for monitoring the quality of a signal transmitted by a satellite in an article numbered WP-13 and entitled "Validation of Revised Signal Quality Monitoring Algorithms for Detecting C/A Code Evil Waveforms" which was presented in Toulouse, France, during the "GBAS Working Group Meeting" which was held from the $20^{th}$ to $24^{th}$ Mar. 2000 as part of the conference "Global Navigation Satellite Systems Panel (GNSSP)", this working group being the "Working Group B". The method proposed in this article essentially consisted in sampling, at precise points in real time, the correlation functions produced in GPS ground-based receivers, in comparing these sampled values to the set values, and in declaring the received signal invalid if the result of the comparison exceeded a certain threshold. This method uses precise assumptions about the characteristics of the detector and the detection criteria are based on the instantaneous observation of the shape of the correlation peak which entirely determines the definition of the receiver and the definition of the detection algorithms. Another method would consist in systematically sampling the correlation peak. This method is satisfactory in theory, but, in order to put it into practice, it would require material means at an exorbitant cost. Indeed, an 18-satellite GPS system, for example, would necessitate 720 correlation channels which would remove any economic advantage of the GPS system, a system which is supposed to be less costly to operate than the existing systems.

SUMMARY OF THE INVENTION

The subject of the present invention is a method for ground-based monitoring of the possible presence of anomalies, in particular of the EWF type, in a signal received from a GPS satellite, which method could be implemented with the minimum of material means possible at the receiving station, without however risking the non-detection of significant anomalies in the received signal.

The method of the invention, which is based on the measurement of the distortion of the correlation peak, consists in taking samples of the correlation peak which is produced during the processing of the signal received from the satellite, in storing these samples over an instantaneous sliding time window of at least around 1 minute duration, in storing these instantaneous windows over a period of at least several hours so as to extract therefrom a statistically determined mean value, in comparing the contents of each instantaneous window to this mean value and, if the result is greater than a detection threshold, in declaring that there is a significant interference affecting the received signal and in eliminating the latter.

BRIEF DESCRIPTION OF THE DRAWINGS

The present invention will better understood upon reading the detailed description of one embodiment, taken as a non-limiting example and illustrated by the appended drawing, in which the single FIGURE is a diagram explaining the weighting step implemented by the method of the invention.

DETAILED DESCRIPTION OF THE DRAWINGS

The method of the invention applies to a receiver receiving signals transmitted by geographical positioning satellites, which receiver is commonly referred to as a GBAS (Ground-Based Augmentation System). This terrestrial receiver comprises an SQM (Signal Quality Monitor) function responsible for continuously monitoring the quality of the received signals and for warning when the quality is unacceptable in order to reject those signals judged unsuitable for positioning measurements and therefore to avoid falsifying the measurements.

DETAILED DESCRIPTION OF THE INVENTION

The ground-based station receiver delivers samples of the received signal correlation peak at the rate of two times per second, with a view to carrying out amplitude measurements in the "in phase" correlator. According to the invention, these samples are five in number and taken at precise instants which are sufficiently characteristic of the correlation peak to determine its exact position with the minimum possible number of samples. These instants are located in a conventional manner using relative values with respect to the period of the PN sequence clock frequency, known as "chip". These values are taken symmetrically with respect to the correlation signal peak, the central value being that of the maximum of the peak (called "prompt"), namely (in values of chip fractions): prompt, ±0.044, ±0.088.

In addition, both short-term and long-term statistical analyses are carried out on the correlation peaks originating from the signals received from each of the satellites concerned, for each of the aforementioned five values, in order to obtain the individual statistical characteristics of these values as a function of the conditions of reception of these signals at the ground-based receiving station. Five standard deviation values $\sigma_i$ (namely: $\sigma_{-0.088}$, $\sigma_{-0.044}$, $\sigma_{prompt}$, $\sigma_{0.044}$ and $\sigma_{0.088}$) and five mean values $\mu_i$ (namely: $\mu_{-0.088}$, $\mu_{-0.044}$, $\mu_{prompt}$, $\mu_{0.044}$ and $\mu_{0.088}$) are thus calculated for each type of analysis (short-term and long-term) and for each satellite concerned.

The short-term analyses are effected within a sliding time window of at least around one minute duration, and the long-term analyses within a sliding time window of at least several hours duration, cumulating all the short-term analyses relating to this long-term window. A variable $\Delta\mu_i$ is then defined, such that $\Delta_i=\mu_i(ct)-\mu_i(\lambda t)$ with $\mu_i(ct)$ being the value of $\mu$ for the sample of rank i considered from the peak relative to the short-term analysis and $\mu_i(\lambda t)$ the value of the same sample relative to the long-term analysis. A weighted criterion sqm for the quality of reception at each analysis period is then calculated, the criterion being given by the following relation:

$$sqm = \frac{\left\| \left[\frac{\Delta\mu_{-0.088}}{s_{-0.088}}\right]^2 + \left[\frac{\Delta\mu_{-0.044}}{s_{-0.044}}\right]^2 + \left[\frac{\Delta\mu_{prompt}}{s_{prompt}}\right]^2 + \left[\frac{\Delta\mu_{+0.044}}{s_{+0.044}}\right]^2 + \left[\frac{\Delta\mu_{+0.088}}{s_{+0.088}}\right]^2 \right\|}{MDE}$$

In this relation, MDE is a detection threshold analytically determined so as to obtain a desired false alarm probability ratio (for example, $7.2\times10^{-8}$ for the OACI standard). If the value of sqm thus calculated is greater than 1, the presence of an abnormal waveform, or EWF, is declared and, consequently, the signals received from the corresponding satellite must be rejected.

It will be noted that the term $(sqm)^2$ follows a chi-square statistical law with four degrees of freedom.

With reference to the OACI standard, the equivalent of the Kffd coefficient, which has a value of 5.26 according to this standard for a distribution with a false alarm probability of $7.2\times10^{-8}$, has a value of 5.36, in the case of the invention, for a statistical distribution following the chi-square law. Accordingly, owing to the fact that the sqm criterion is weighted, MDE must have a value of 5.36 in order to obtain the same false alarm probability ratio.

A shift register 1 which receives, at one end, the stream 2 of PRN codes of the signal received from a satellite is shown schematically in the single FIGURE. The stream of internal PRN codes generated in the receiver at the ground-based reception station is indicated by an arrow 3.

These internal codes have the values that the samples of the correlation peak should have at the aforementioned sampling instants (central point, ±0.044, ±0.088) if the received signals were not affected by parasitic EWF. The internal codes corresponding to instants −0.088, −0.044, prompt, +0.044 and +0.088 are each sent to an input of a convoluter, 4 to 8 respectively, whose other input respectively receives the following values: contents of the register for the instant −0.088, contents for the instant −0.044, difference of the contents of the registers relative to the instants +0.044 and −0.044 (obtained by a subtractor 10), and contents for the instants +0.044 and +0.088. In addition, the contents of the register for the instant where the prompt should appear are sent to a convoluter 9.

The six resulting correlation channels at the output of the convoluters 4 to 9 are respectively: $I_{-0.088}$ and $Q_{-0.088}$, $I_{-0.044}$ and $Q_{-0.044}$, $I_\Delta$ and $Q_\Delta$ ("delta" mode), $I_{0.044}$ and $Q_{0.044}$, $I_{0.088}$ and $Q_{0.088}$, $I_{prompt}$ and $Q_{prompt}$ ("point" mode). The "delta" and "point" mode channels are used to follow the corresponding satellite, and the four other channels are used for the I and Q (in phase and in quadrature) measurements at the four corresponding sampling points of the correlation peak.

What is claimed is:

1. A method for the ground-based monitoring of EWF-type anomalies in a positioning satellite signal, characterized in that it consists in taking samples of the correlation peak which is produced during the processing of the received signal, in storing these samples over an instantaneous sliding time window of at least around 1 minute duration, in storing these instantaneous windows over a period of at least several hours so as to extract therefrom a statistically determined mean value, in comparing the contents of each instantaneous window to this mean value and, if the result is greater than a detection threshold, in declaring that there is a significant interference affecting the received signal and in eliminating the latter.

2. The method as claimed in claim 1, characterized in that the samples are five in number for each correlation peak analyzed, and in that instants corresponding to the appearance of the maximum of the peak, to ±0.044 chip and to ±0.088 chip relative to the peak maximum are sampled.

3. The method as claimed in claim 2, characterized in that the weighted criterion (sqm), whose purpose is to determine the quality of the received signal, is given by the relation:

$$sqm = \frac{\left\| \left[\frac{\Delta\mu_{-0.088}}{s_{-0.088}}\right]^2 + \left[\frac{\Delta\mu_{-0.044}}{s_{-0.044}}\right]^2 + \left[\frac{\Delta\mu_{prompt}}{s_{prompt}}\right]^2 + \left[\frac{\Delta\mu_{+0.044}}{s_{+0.044}}\right]^2 + \left[\frac{\Delta\mu_{+0.088}}{s_{+0.088}}\right]^2 \right\|}{MDE}$$

in which $\Delta\mu_i=\mu_i(ct)-\mu_i(ct)$, where $\mu_i(ct)$ is the value of $\mu$ for the sample of rank i considered from the peak relative to the short-term analysis and $\mu_i(\lambda t)$ is the value of the same sample relative to the long-term analysis, $\sigma_i$ is the standard deviation for each of these samples and MDE is a detection threshold which is determined so as to obtain a desired false alarm probability ratio, and where the value of sqm thus calculated must exceed unity for the presence of a significant interference to be declared.

* * * * *